(12) United States Patent
Berthiaume

(10) Patent No.: US 7,360,476 B2
(45) Date of Patent: Apr. 22, 2008

(54) CUTTING GUIDE AND METHOD OF USING THE SAME

(76) Inventor: Raymond Berthiaume, 606, Chambertin Street, Rosemère, Quebec (CA) J7A 4NB ( * ) Notice: Subject to any disclaimer, the term of this patent is extended or adjusted under 35 U.S.C. 154(b) by 342 days.

(21) Appl. No.: 10/367,990

(22) Filed: Feb. 14, 2003

(65) Prior Publication Data
US 2005/0098009 A1    May 12, 2005

(30) Foreign Application Priority Data
Feb. 14, 2002    (CA)    ................................. 2372060

(51) Int. Cl.
  *B26D 7/01*    (2006.01)
  *B23Q 3/00*    (2006.01)
(52) U.S. Cl. ............... 83/467.1; 83/466.1; 83/468; 83/468.3; 83/468.7; 83/465; 83/471.3; 83/490; 83/581
(58) Field of Classification Search ............ 83/471.3, 83/473, 490, 468.3, 468.4, 581, 469, 698, 83/435.12, 465, 468, 468.7, 435.11, 462, 83/409, 466.1, 781, 477.1, 449, 452, 459, 83/451, 467.1, 762; 269/303, 304, 236, 315, 269/319, 36, 86, 90, 203; 144/287, 144.1, 144/145.1, 144.3; 312/317.1, 317.2, 317.3; 248/122.1; D7/631
See application file for complete search history.

(56) References Cited

U.S. PATENT DOCUMENTS

| | | | |
|---|---|---|---|
| 1,798,342 A * | 3/1931 | Trepte | ..................... 269/202 |
| 3,348,591 A * | 10/1967 | Carrasco | ..................... 83/468.2 |
| 3,397,722 A | 8/1968 | Long | |
| 3,603,360 A * | 9/1971 | Botefuhr | .................... 83/68 |
| 4,281,827 A | 8/1981 | Horwath | |
| 4,300,755 A | 11/1981 | Potvin | |
| 4,346,636 A | 8/1982 | Taylor | |
| 4,350,066 A | 9/1982 | Volk | |
| 4,531,441 A | 7/1985 | Bergler | |
| 4,608,899 A | 9/1986 | Twigger et al. | |
| 4,743,004 A * | 5/1988 | Kloss | ..................... 269/296 |
| 4,842,453 A * | 6/1989 | Raines et al. | ..................... 408/89 |
| 4,875,399 A | 10/1989 | Scott et al. | |
| 5,038,486 A * | 8/1991 | Ducate, Sr. | ..................... 33/430 |
| 5,239,905 A | 8/1993 | Dunn | |
| 5,560,273 A | 10/1996 | Keddie | |
| 5,730,434 A | 3/1998 | Schoene et al. | |
| 5,737,990 A | 4/1998 | Freeland et al. | |
| 5,819,623 A | 10/1998 | Sasaki et al. | |
| 6,418,320 B2 | 7/2002 | Yoshida et al. | |
| 6,484,320 B1 * | 11/2002 | Grady | ..................... 2/82 |
| 6,775,917 B1 * | 8/2004 | Campbell | ..................... 33/640 |

(Continued)

FOREIGN PATENT DOCUMENTS

GB    2 339 478 A    1/2000

*Primary Examiner*—Ghassem Alie
(74) *Attorney, Agent, or Firm*—Darby & Darby P.C

(57) ABSTRACT

A cutting guide having a component defining a first plane positionable substantially parallel to a working table of a cutting tool and a second plane, the second plane forming a predetermined angle inferior to 90 degrees relative to the first plane so as to receive at least in part a piece to cut and orienting the same according to a predetermined inclined plane. The cutting guide also includes an adapter allowing for modification of the predetermined angle, the adapter being releasably mountable to the component so that one of the faces of the adapter defines a new inclined plane.

11 Claims, 10 Drawing Sheets

U.S. PATENT DOCUMENTS

| | | | |
|---|---|---|---|
| 6,782,782 B1 * | 8/2004 | Shangle et al. | 83/467.1 |
| 6,857,829 B2 * | 2/2005 | Newton et al. | 408/89 |
| 6,938,528 B2 * | 9/2005 | Lewis | 83/13 |
| 2005/0166742 A1 * | 8/2005 | Collins et al. | 83/762 |
| 2006/0053992 A1 * | 3/2006 | Williams et al. | 83/435.12 |

* cited by examiner

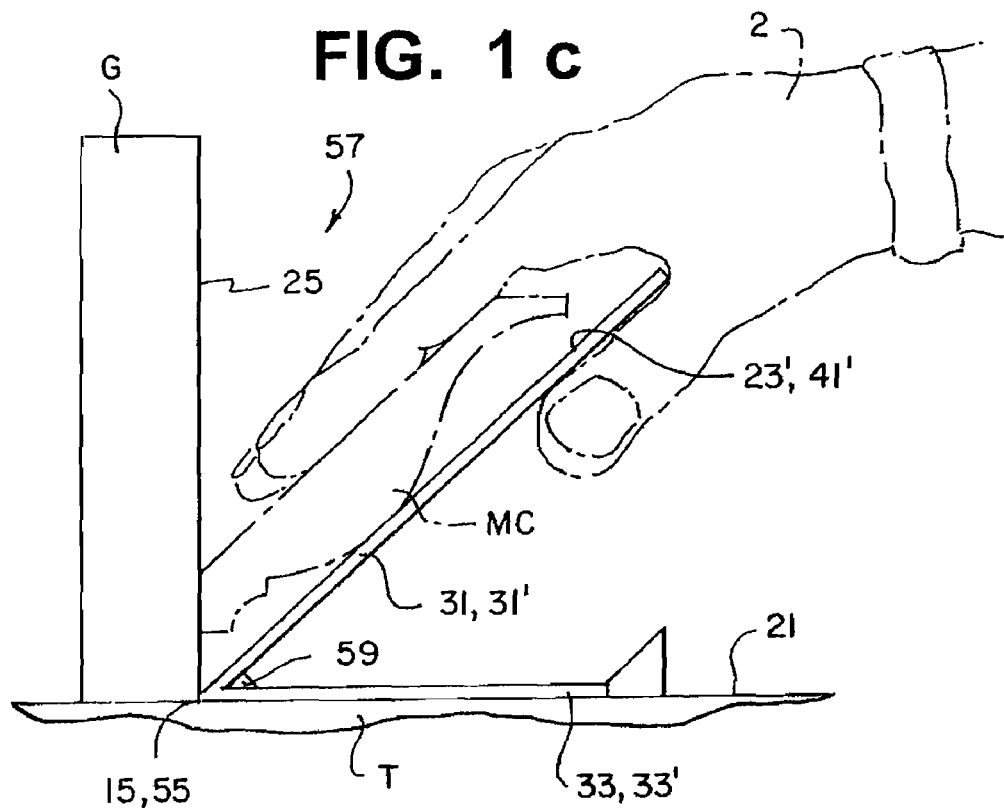
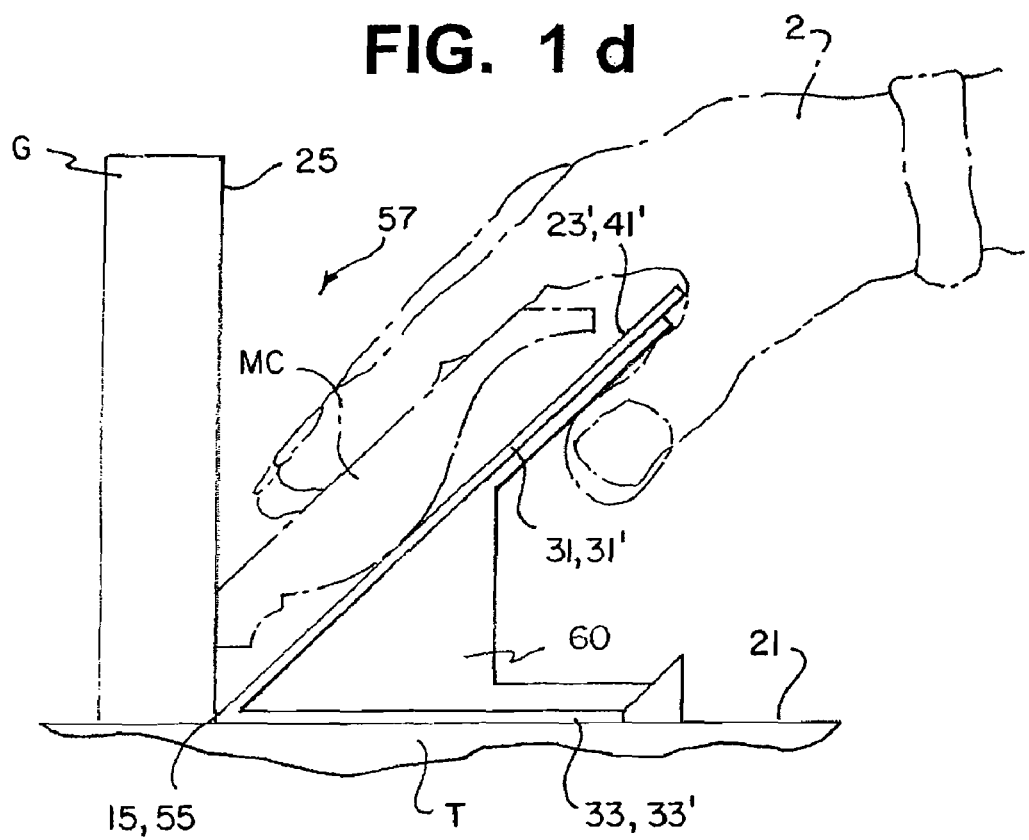

FIG. 7
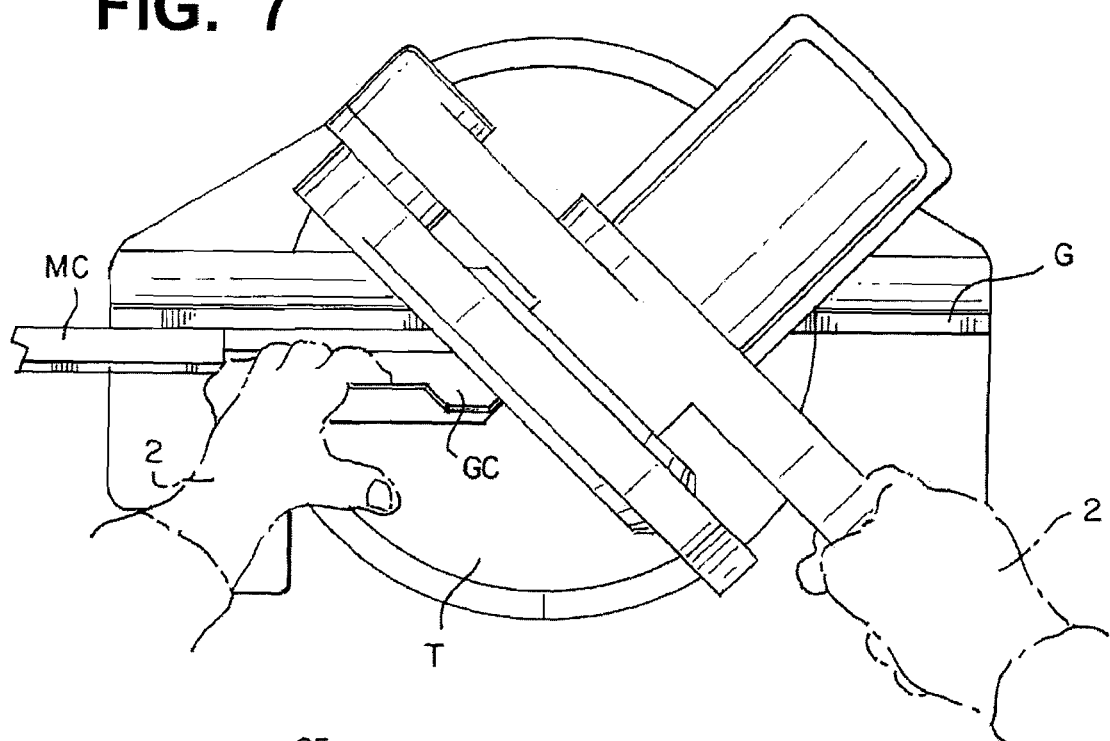
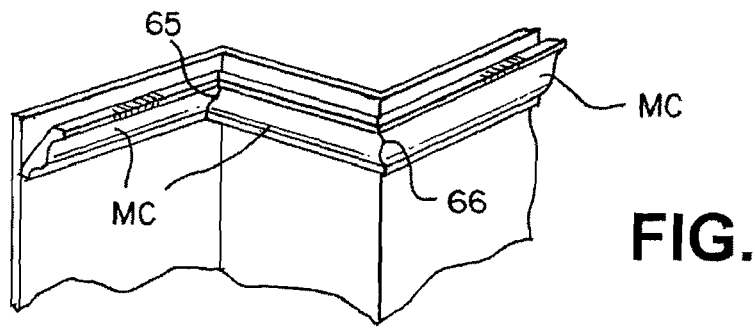
FIG. 8
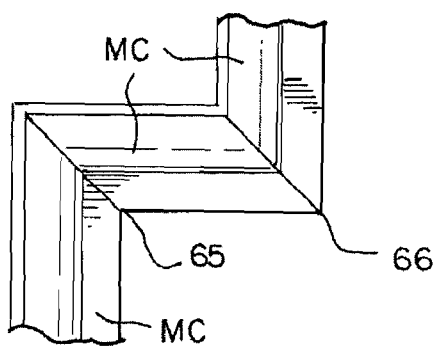
FIG. 8a

CUTTING GUIDE AND METHOD OF USING THE SAME

FIELD OF THE INVENTION

The present invention relates to cutting guides for cutting various types of materials having various configurations and, in particular, to a cutting guide for cutting crown mouldings and the like. The cutting guide allows for the positioning on conventional mitre-type cutting tools of mouldings such as a crown moulding according to the final installation orientation of the moulding without requiring elaborate calculations.

The present invention also relates to a method of using the cutting guide in accordance with the present invention.

BACKGROUND OF THE INVENTION

The cutting of various types of planks, such as "OGEE"—type crown mouldings may prove to be particularly tedious. Indeed, since crown mouldings are designed so as to be mounted at the intersection of a wall and a ceiling, they typically require complex cuts in order to produce the desired assembly angle. The difficulty in cutting crown mouldings is due, at least in part, to the fact that the mouldings are typically mounted at a predetermined angle (i.e. 38°, 45° or 52°) between the wall and the ceiling and must also be cut at an angle in order to follow the angle of the wall corners. Other types of mouldings similar to crown mouldings such as mouldings used for moulding cornices or shelves also sometimes require similar cuts.

The difficulties associated with cutting mouldings such as crown mouldings have been addressed in the prior art. For example, U.S. Pat. No. 4,281,827 discloses a mitre box allowing for the cutting of crown mouldings according to the final installation position of the moulding without requiring complex calculations or other complicated procedures. However, this mitre box suffers from numerous drawbacks.

For example, since the moulding is supported between two spaced-apart abutment locations the moulding may be deformed under the action of the saw. This may, in turn, lead to blockage of the saw blade and/or the moulding. It may also potentially lead to injuries. Furthermore, since clamps are required to secure the moulding in place, it becomes impossible to cut a portion of moulding inferior in length to the spacing between the abutment points.

U.S. Pat. No. 4,350,066 discloses a crown moulding supporting structure usable on a sawing table. The supporting structure, however, does not allow for orientation of the moulding according to its final installation position. Furthermore, since the moulding is angularly displaced relative to the blade, the portion of the moulding being cut will either interfere with the support 31, or be cumbersome to use.

U.S. Pat. No. 6,481,320 discloses a crown moulding support usable with a motorised mitre saw. This support structure does not however allow for orientation of the moulding according to its final installation position. Furthermore, the thickness of the moulding will influence the cutting angle.

Accordingly, none of the prior art documents provides a cutting guide that allows for pieces such as a crown moulding to be cut according to their final installation orientation while reducing the risks of errors in the orientation of the cut that, the cutting guide being easy and simple to use without requiring that the piece being cut be mechanically secured and without requiring recourse to complicated calculations or other complex procedures. Furthermore, none of the prior documents allows for the realisation of a cutting guide that is usable with existing meter-type cutting tools, that is safe to use and also reduces the risk or damaging the moulding.

SUMMARY OF THE INVENTION

The present invention relates to a cutting guide allowing for precision cutting of pieces (such as planks) made of various types of materials and having various configurations, being finely carved or not and more particularly of crown mouldings such as "OGEE"-type moulding or analogous mouldings such as mouldings used for building cornices, shelves and the like.

Particularly, the present invention relates to a cutting guide allowing for positioning of a piece of material such as a crown moulding according to its final installation orientation relative to the blade of a mitre cutting tool.

Advantageously, the present invention relates to a cutting guide that is easy and simple to operate, that does not require mechanical attachment of the piece being cut and does not require recourse to complicated calculations or other complex procedures.

Advantageously, the hereinabove mentioned cutting tool is provided with a working table extending in a substantially horizontal plane, a guide extending in a substantially vertical plane and means for allowing angular positioning of the blade relative to the guide. The working table and guide planes are typically substantially orthogonal.

Such cutting tools may, for example, consist of a mitre saw (manual or electric), a saw bench or any other tool or apparatus for cutting materials such as wood, wood derivatives, plastics, polymer derivatives, metallic materials, ferrous or not, plaster, concrete or the like. Preferably, the cutting tool may be a combined-type mitre saw having a motorised blade such as a blade coupled to an electric motor. Optionally, the blade may either be a conventional blade (such as a toothed steel blade), or a grinding blade when appropriate.

The piece of material being cut is typically of the type including a longitudinal axis, a front portion, a rear portion substantially parallel to the axis and an inferior portion substantially parallel to the axis. Preferably, the piece being cut is a crown moulding or an analogous moulding (for example a moulding allowing for the building of cornices, shelves and the like). More particularly, the piece being cut is a crown moulding.

Advantageously, the cutting guide is characterised by comprising: a longitudinal axis and opposed ends;

first means cooperating with the working table and guide planes for maintaining the longitudinal axis of the cutting guide substantially parallel to the orthogonal plane and; second means comprising a first plane either parallel and adjacent relative to the plane of the working table or coplanar with that of the working table, or parallel and adjacent the guide plane or coplanar with the guide plane, and a second plane forming a predetermined angle smaller than 90 degrees relative to a first plane for receiving and orienting at least part of the piece according to a predetermined inclined plane, when the piece is maintained against the first and second planes for positioning in a stable manner the piece substantially according to its final installation orientation and for positioning the longitudinal axis of the piece substantially parallel to that of the cutting guide;

the piece being adapted to be maintained manually against the first and second planes and the cutting guide being adapted to be positioned relative to the cutting trajectory of the blade so that the piece is cut at a desired angle and a desired length adjacent one of cutting guide ends.

Preferably, the cutting guide is characterised by comprising:

a longitudinal axis and opposed ends;

first means cooperating with the working table and guide planes for maintaining the longitudinal axis of the cutting guide substantially parallel to the orthogonal planes; and;

second means including a first plane parallel and adjacent to the working table plane or coplanar with the working table plane, and a second plane forming a predetermined angle smaller than 90 degrees relative to the first plane for receiving and orienting at least part of the rear portion of the piece to be cut, according to a predetermined inclined plane, when the piece to be cut is maintained against the first and second planes for positioning a stable manner the piece substantially according to its final installation orientation and for positioning the longitudinal axis of the piece to be cut substantially parallel to that of the cutting guide;

the piece being adapted to be maintained manually against the first and second planes and the cutting guide being adapted to be positioned relative to the cutting trajectory of the blade so that the piece is cut a desired angle and a desired length adjacent one of the cutting guide ends.

Advantageously, the invention relates to a method for cutting a piece of material, characterised by the positioning of a cutting guide as hereinabove disclosed, on a cutting tool including a working table having a substantially horizontal plane, a guide having a substantially vertical plane, a blade and means for angularly positioning the blade relative to the guide, the working table plane and the guide plane forming substantially orthogonal planes; the cutting guide having its first means cooperating with the working table plane and the guide plane for maintaining is longitudinal axis substantially parallel to the orthogonal planes; characterised in that the piece to be cut is positioned so that either its rear portion is against the inclined plane and the inferior portion is against the working table plane, or its front portion is against the inclined plane and its inferior portion is against the cutting guide plane, characterised in that the piece to be cut is maintained manually against the inclined plane and either the working table or guide planes, and characterised in that the cutting guide is positioned relative to the cutting trajectory of the blade so that the piece is cut at a desired angle and a desired length adjacent one of the cutting guide ends.

Preferably, the invention also relates to a method for cutting a piece, characterised in that the cutting guide is positioned as hereinabove defined on a mitre cutting tool including a working table having a substantially horizontal plane, a guide having a substantially vertical plane, a blade and means for angularly positioning the blade relative to the guide, the working table and guide planes forming orthogonal planes; the cutting guide having its first means cooperating with the working table and guide planes for maintaining its longitudinal axis substantially parallel to the orthogonal planes; characterised in that the piece to be cut is positioned so that its rear portion is against the inclined plane and the inferior portion of the piece is against the parallel plane and adjacent to the working table or a plane coplanar with the working table; characterised in that the piece is maintained manually against respectively the inclined plane and the plane parallel and adjacent to the table or coplanar to the working table; and characterised in that the cutting guide is positioned relative to the cutting trajectory of the blade so that the piece is cut at a desired angle and at a desired length adjacent one of the cutting guide ends.

The piece is preferably a crown moulding or an analogous moulding (for example: a moulding used for making a cornice, a wall shelf or the like).

Advantageously, the invention relates to a cutting guide wherein the cutting angle (i.e. the angle orienting the piece according to its final installation position) may be adjustable or permanently predetermined. Preferably, the cutting angle is permanently predetermined.

Advantageously, the invention relates to a cutting guide wherein its ends or portions thereof may be bevelled.

Advantageously, the invention relates to a cutting guide that can be manufactured with various materials as long as they are sufficiently rigid to satisfy manufacturing and usage requirements. For example, materials such as steel or its derivatives, aluminum or its derivatives, plastic or its derivatives or any other suitable material may be used.

Advantageously, the present invention relates to a cutting guide that may be manufactured using various manufacturing processes such as stamping, extrusion, injection moulding, bending, with or without welding sports or any other suitable manufacturing methods.

Preferably, the cutting guide is made out of a single piece of polymeric resin, for example PVC, and is manufactured using conventional injection moulding techniques.

Plastic injection moulding techniques are well known and, hence, do not require a detailed description in the present specification.

Advantageously, the invention relates to a cutting guide as hereinabove defined, characterised in that the first means comprises at least one rear abutment adapted to contact the orthogonal planes substantially at their meeting point, and characterised in that the second means includes at least one component adapted to abut against one of the orthogonal planes.

Advantageously, the invention relates to a cutting guide as hereinabove defined, characterised in that the second means comprises a first component and a third component, characterised in that the first component comprises a longitudinal axis and an anterior face having at least one contact points for receiving a rear portion of a piece, notably a piece such as a crown moulding or an analogous moulding, the contact points being substantially coplanar with the inclined plane, characterised in that the third component comprises a longitudinal axis and a face provided with one or more contact points adapted to contact the guide plane of the cutting tool. Preferably, the first and third components are linked to one another by a common edge.

Advantageously, the invention relates to a cutting guide as hereinabove defined, characterised in that the second means comprises a first component and a second component, characterised in that the first component comprises a longitudinal axis and a posterior face presenting one or more contact points for the front portion of the crown moulding, the contact points being substantially coplanar with the inclined plane, characterised in that the second component comprises a longitudinal axis and a inferior face provided with one or more contact points adapted to contact the working table plane. Preferably, according to this option, the first component and the second component each consist in a plate made out of a substantially deformation-resistant material, each plate having a common edge defining the abutment, and the plates forming an open-top throat having a substantially V-shaped cross-sectional configuration.

Advantageously, the invention relates to a cutting guide as hereinabove defined, characterised in that the second means comprises a first component and a second component, characterised in that the first component comprises a longitudinal axis and an anterior face presenting one or more contact points for receiving the rear portion of a piece, notably a piece such as a crown moulding or an analogous moulding, the contact points being substantially coplanar with the inclined plane, characterised in that the second component comprises a longitudinal axis and an inferior face provided with one or more contact points adapted to contact the working table plane and a superior face comprising a plane substantially adjacent and parallel to that of the working table. Preferably, the first component and the second component are linked to one another by a common edge.

More particularly, the invention relates to a cutting guide wherein the second means comprises a first component, a second component and a third component, characterised in that the first component comprises a longitudinal axis and an anterior face presenting one or more contact points for receiving the rear portion of a piece, notably a piece such as a crown moulding or an analogous moulding, the contact points being substantially coplanar with the inclined plane, characterised in that the second component comprises a longitudinal axis and an inferior face provided with one or more contact points adapted to contact the working table plane and a superior face comprising a plane substantially adjacent and parallel to that of the working table, and characterised in that the third component comprises a longitudinal axis and a face provided with one or more contact points adapted to contact the guide plane of the cutting tool. Preferably, the first component, the second component and the third component are linked together by a common edge.

Advantageously, the first and second components each consist in a plate of material substantially resistant to deformations, each plate having a common edge defining the abutment, and the plates together forming an open-front throat having a substantially V-shaped cross-sectional configuration. Preferably, the third component consists in a plate of substantially deformation-resistant material, the plate having a common edge with the edge of the first and second plates defining the abutment.

Preferably, the invention relates to a cutting guide as hereinabove defined wherein structural reinforcement means are provided between the first and third components. Preferably, the invention also relates to a cutting guide wherein structural reinforcement means are provided between the first and second components. Preferably, the reinforcement means comprises reinforcement components integral with the corresponding components.

Advantageously, the invention relates to a cutting guide as hereinabove defined, characterised in that the third component comprises a superior edge, and characterised in that the superior edge displays marks and/or references for determining the blade orientation relative to the end of the piece to be cut (left or right) and the type of assembly to be realised (exterior or interior corner). Preferably, the piece to be cut may be a crown moulding or an analogous moulding.

Advantageously, the invention relates to a cutting guide as hereinabove defined, characterised in that a portion of the first and second component ends are bevelled (for example at 45 degrees). This characteristic allows positioning of the cutting guide more closely to the blade of the cutting tool hence increasing the stability of the cutting guide and of the piece to be cut.

Advantageously, the invention relates to a cutting guide as hereinabove defined and characterised in that the angle of the inclined plane is 45 degrees.

Advantageously, the invention relates to a cutting guide as hereinabove defined and characterised in that it comprises a corner-shaped adapter allowing for modification of the predetermined angle of the inclined plane, the adapter being provided with means for releasable attachment thereof to the first element so that one of the faces of the corner defines a new inclined plane. Preferably, the adapter forms a 7 degree corner allowing for modification of an initial predetermined angle of 45 degrees into a predetermined angle of 38 degrees of 52 degrees, depending on whether the adapter is inserted in one direction or the other.

Preferably, the means for releasably attaching the adapter to the first component may be any suitable means depending on the material from which the cutting guide and adapter are made. For example, it may include one or more clips, reusable attachments, magnets, or the like. Preferably, the means for releasably attaching the adapter to the first component consist in a clip coupled to the superior edge of the first component and to a superior edge of the adapter.

Optionally, the clip forms an integral part of the superior edge of the adapter. In such a situation, a separate adapter is provided for increasing the initial angle by 7 degrees and another adapter for decreasing the predetermined initial angle by 7 degrees.

Advantageously, the invention relates to an adapter characterised in that it is manufactured out of a single piece of material and is made out of a material similar to that of the cutting guide, preferably a polymeric plastic material (for example PVC) substantially resistant to deformations.

Advantageously, the invention relates to a cutting guide wherein at least one shoulder is provided for attachment thereof on the mitre-type cutting tool, notably with fixing means such as one or more substantially horizontal clamps. Preferably, the second component is provided with a front shoulder adapted to cooperate with a fixing device against the guide of the cutting tool. Alternatively, the superior edge of the third component may also define a shoulder adapted to cooperate with a fixing device such as one or more substantially vertical clamps.

BRIEF DESCRIPTION OF THE DRAWINGS

Some preferred embodiments of the invention will now be described in details and with reference to the following drawings in which:

FIGS. 1c and 1d each illustrate, in a side view, alternative embodiments of a cutting guide in accordance with the present invention;

FIG. 7, in a top view, illustrates the cutting guide shown in FIG. 1, a schematically represented motorised mitre saw, a crown moulding and the hands of an intended user.

FIGS. 8 and 8a illustrate respectively a perspective view and a top view of crown mouldings cut for forming opened and closed joints;

DETAILED DESCRIPTION OF PREFERRED EMBODIMENTS

Figure 1:
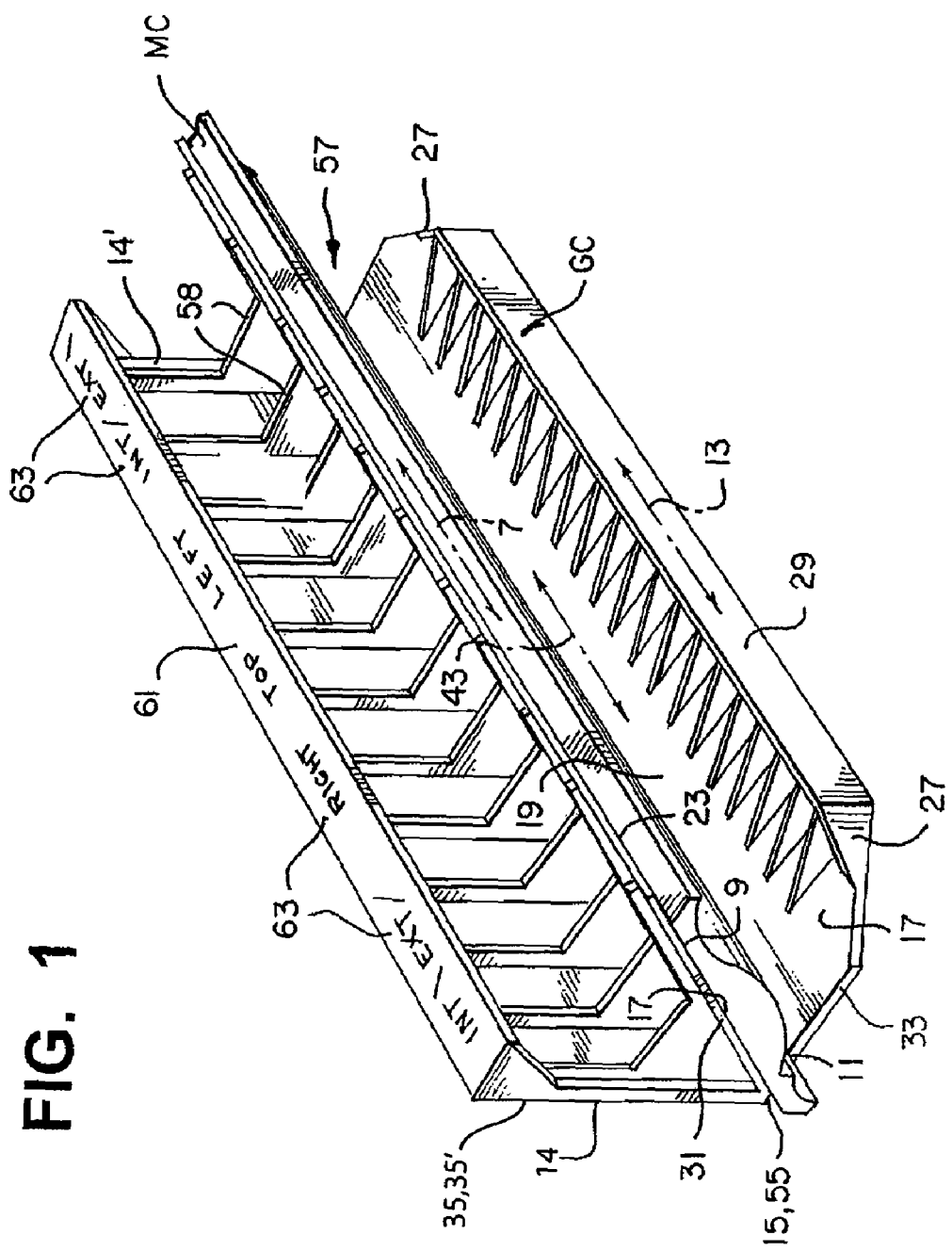
FIG. 1, in a perspective view, illustrates a cutting guide in accordance with an embodiment of the present invention, the cutting guide being shown used with a crown moulding.

In accordance with a preferred aspect of the invention, the latter concerns a cutting guide "GC" allowing for precision cutting of pieces (such as planks) of various materials and more particularly of crown mouldings "MC" such as "OGEE"-type mouldings or analogous mouldings (for example, mouldings for cornices, shelves, or the like.

More particularly, the invention relates to a cutting guide "GC" allowing for the positioning of a crown moulding "MC" (finely carved or not) according to its final installation orientation (see FIG. 8), relative to the blade of a cutting tool "OC" (see FIGS. 2, 2a, 7, 12, and 13). The cutting tool "OC" is provided with a substantially horizontal working table "T", a substantially vertical guide "G" and means "M" for angularly positioning the blade relative to the guide "G". The working table "T" and the guide "G" form orthogonal planes 21 and 25 (see FIGS. 2 and 12).

Preferably, as illustrated in FIGS. 2, 2a, 7, 12, and 13, the cutting tool "OC" may be a combined-type mitre saw 1 having a blade 3 driven by a motor such as electric motor 5.

The crown moulding "MC" is typically of the type including a longitudinal axis 7, a rear portion 9 substantially parallel to the axis 7 and an inferior portion 11 substantially parallel to the axis 7.

Advantageously, the cutting guide "GC" is characterised by comprising: a longitudinal axis 13 and two opposed ends 14 and 14';

first means 15 cooperating with the working table "T" and the guide "G" for maintaining the longitudinal axis 7 of the cutting guide "GC" substantially parallel to the working table "T" and to the guide "G"; and second means 17 including a first plane 19 parallel and adjacent to the plane 21 of the working table "T" or coplanar with the plane 21 of the working table "T", and a second plane 23 forming a predetermined angle inferior to 90 degrees relative to the first plane 19 for receiving and orienting at least part of the rear portion 9 of the crown moulding "MC" according to a predetermined inclined plane, when the crown moulding "MC" is maintained against the first and second planes 19 and 23 for positioning the crown moulding "MC", substantially according to its final installation orientation and for positioning the longitudinal axis of the crown moulding "MC" to be cut, substantially parallel to that of the cutting guide "GC";

the crown moulding "MC", being destined to be manually maintained (see hand 2) against the first and second planes 19 and 23 and the cutting guide "GC" being adapted to be positioned relative to the trajectory of the blade 3 so that the drown moulding "MC" is cut at a desired angle and at a desired length adjacent one of its ends 14, 14'.

Figure 4:
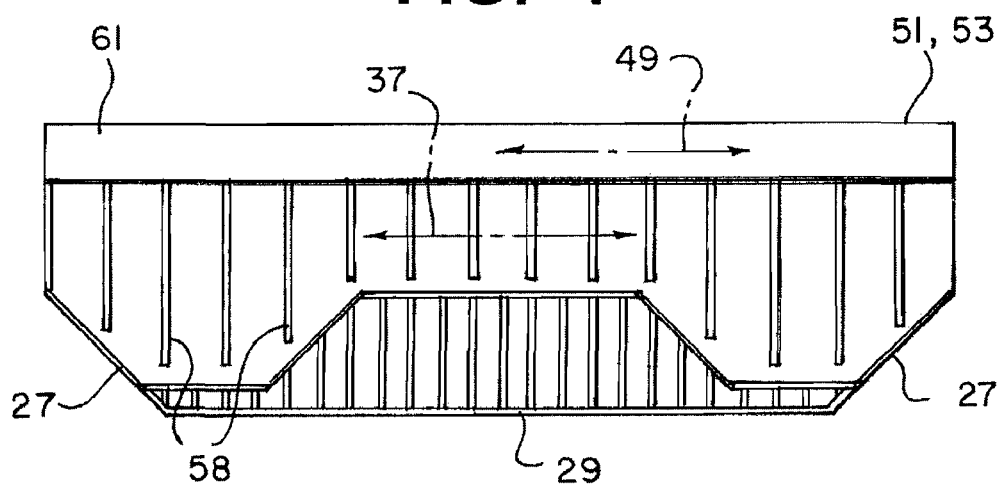
FIG. 4, in a top view, illustrates the cutting guide shown in FIG. 1.
Figure 5:
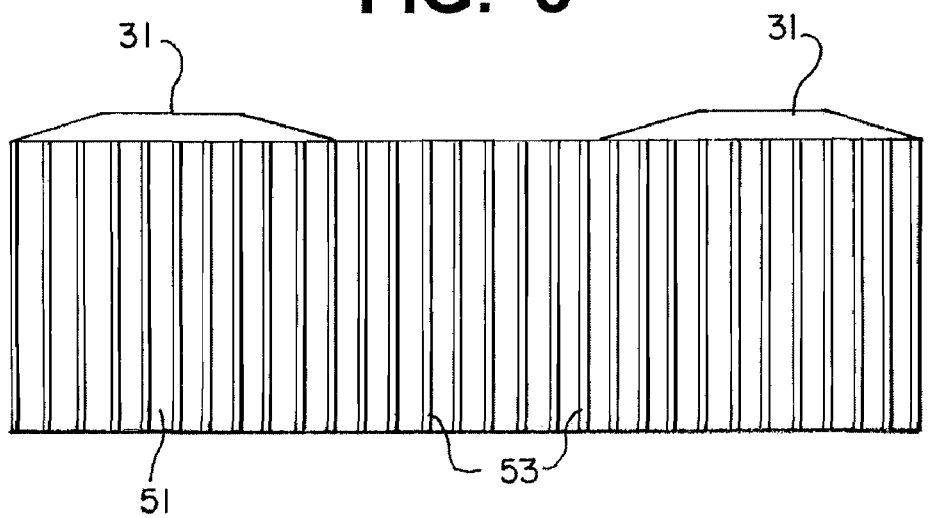
FIG. 5, in a rear view, illustrates the cutting guide shown in FIG. 1.
Figure 6:
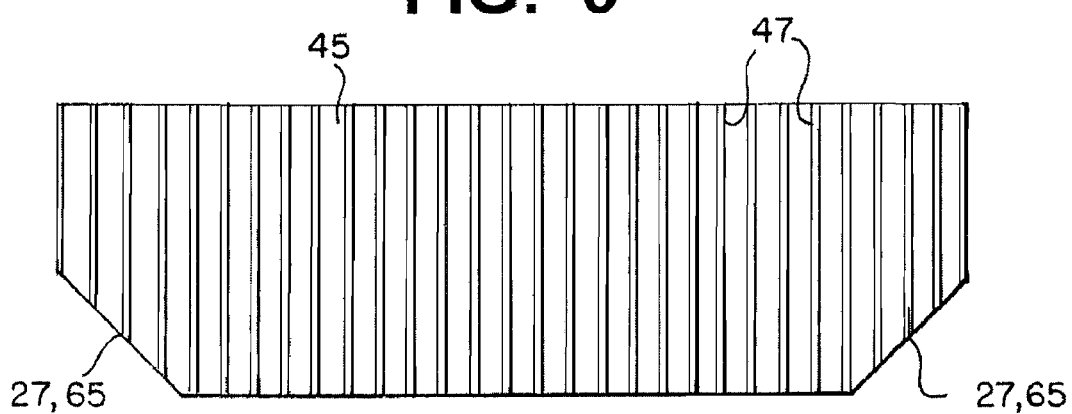
FIG. 6, in a bottom view, illustrates the cutting guide shown in FIG. 1.
Figure 9:
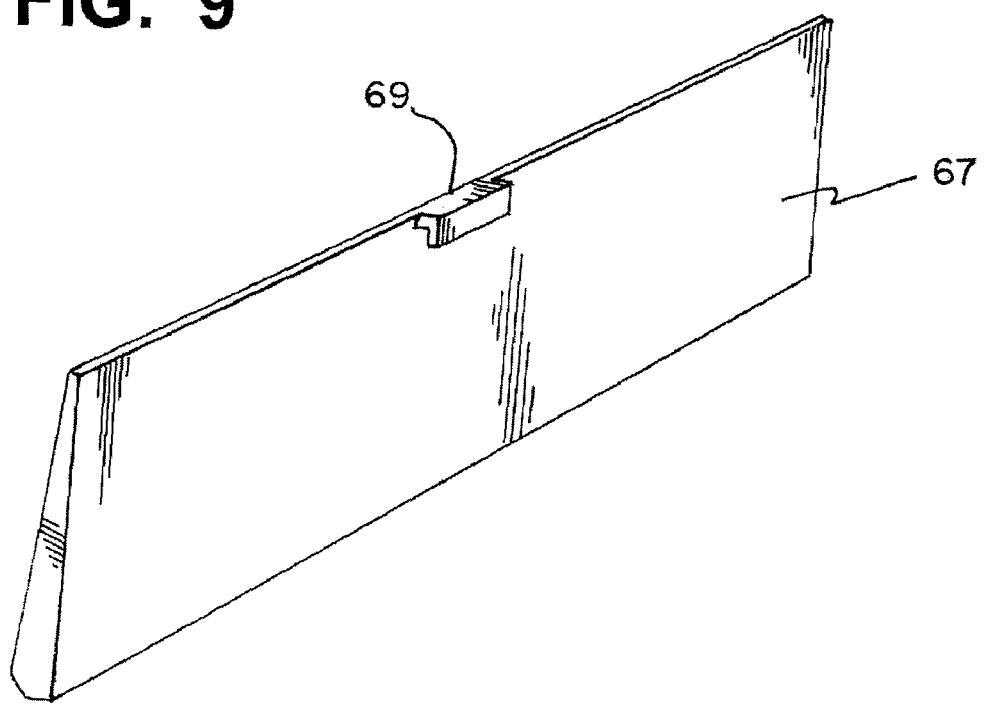
FIG. 9 represents a perspective view of an adapter usable for increasing the angle of the inclined plane on which the back of the crown moulding abuts.
Figure 10:
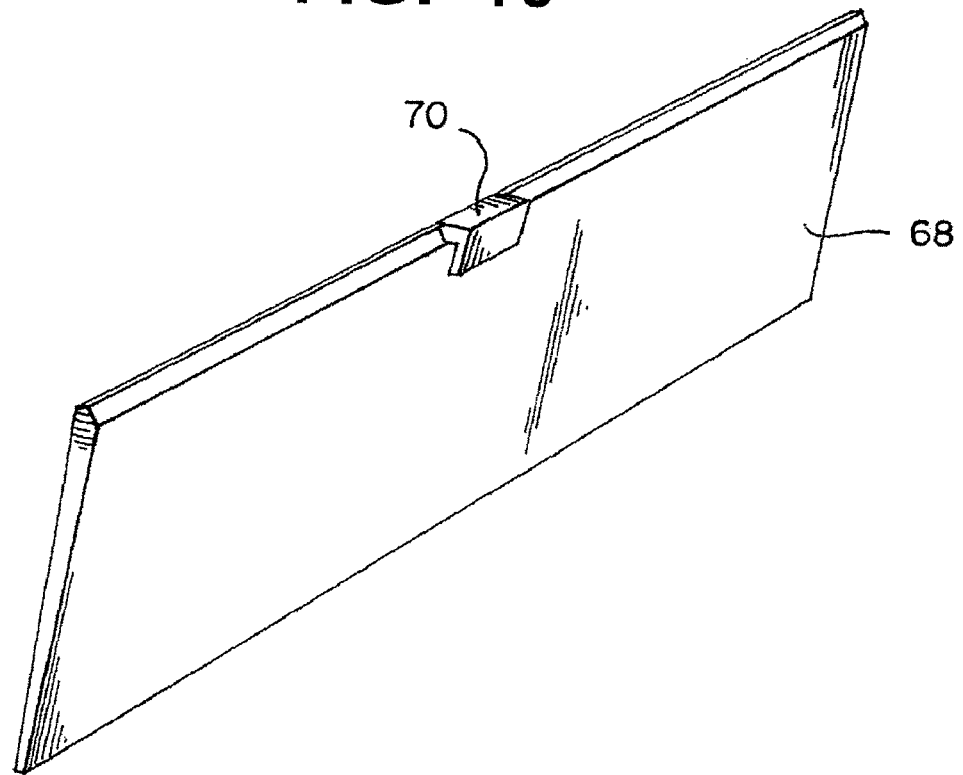
FIG. 10 represents a perspective view of an adapter usable for reducing the angle of the inclined plane on which the back of the crown moulding abuts.
Figure 11:
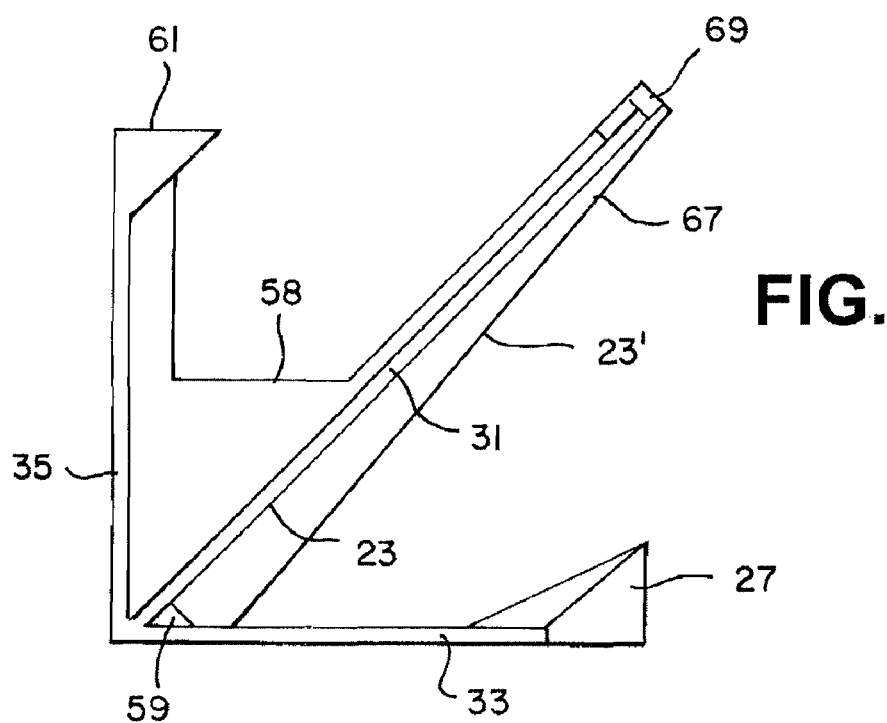
FIG. 11 represents a side view of the cutting guide shown in FIG. 1 provided with the adapter shown in FIG. 9.
Figure 11A:
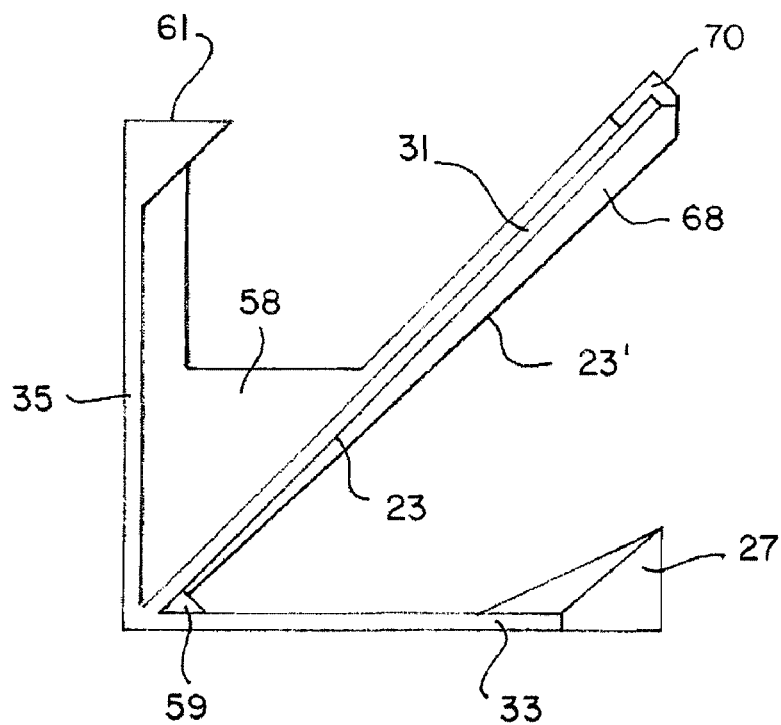
FIG. 11a represents a side view of the cutting guide shown in FIG. 1 provided with the adapter shown in FIG. 10.

Advantageously, the invention relates to a cutting guide "GC" provided with tapered ends 27, 27' (see FIGS. 4 and 6).

Figure 12:
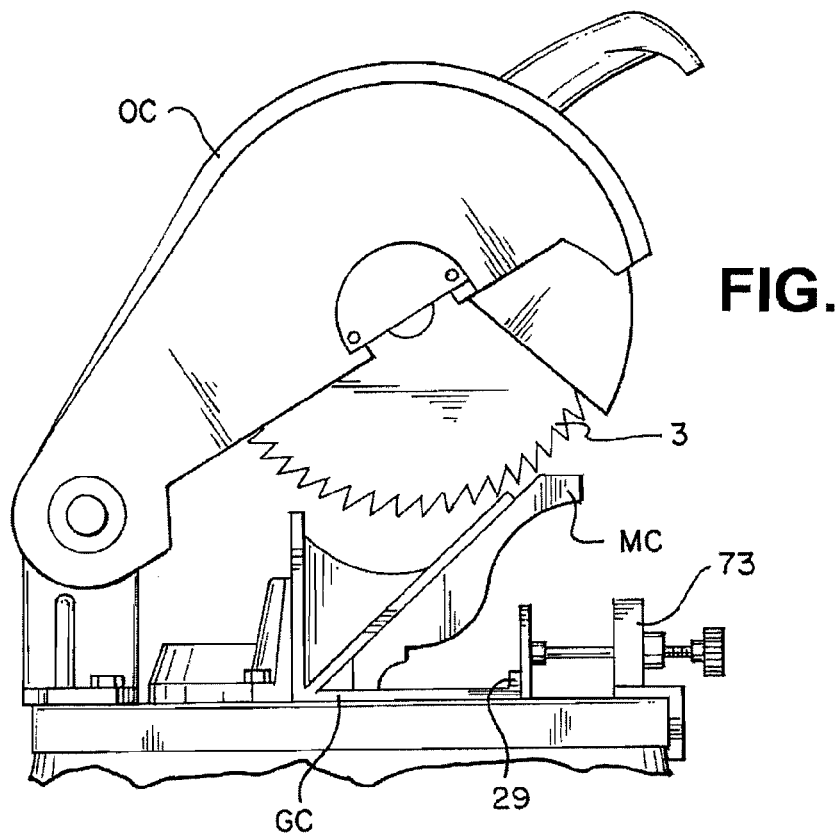
FIG. 12 represents a side view of an adapter in accordance with the present invention that may be fixed to a motorised mitre saw using a substantially horizontal clamp.

Advantageously, the invention relates to a cutting guide wherein at least one shoulder 29 thereof may be provided for fixing in place of the cutting tool, notably with one or more horizontal clamps 73 (see FIG. 12).

Advantageously, the invention relates to a cutting guide "GC" which is made out of an integral single piece of plastic, notably PVC, and is manufactured according to conventional injection moulding techniques.

Figure 3:
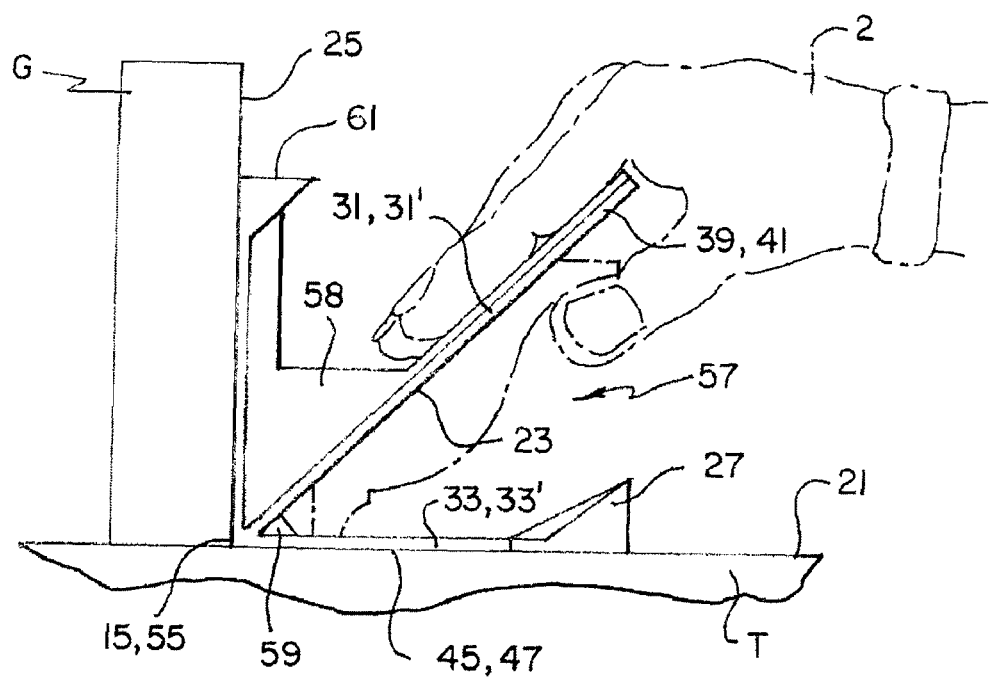
FIG. 3, in a side view, illustrates the cutting guide shown in FIG. 1.

More particularly, the invention relates to a cutting guide "GC" wherein the second means 17 comprises a first component 31, a second component 33 and a third component 35, characterised in that the first component 31 comprises a longitudinal axis 37 (see FIG. 4) and an anterior face 39 (see FIG. 3) presenting one or more contact points, preferably a smooth surface 41 for receiving the rear portion 9 of the crown moulding "MC", the contact points (preferably surface 41) being substantially coplanar with the inclined plane 23, characterised in that the second component 33 comprises a longitudinal axis 43 (see FIG. 1) and an inferior face 45 (see FIG. 3) provided with one or more contact points 47 adapted to contact the plane 21 of the working table "T" and a superior face comprising a plane 19 substantially parallel and adjacent to the plane 21 of the working table "T", and characterised in that the third component 35 comprises a longitudinal axis 49 (see FIG. 4) and a face 51 provided with a plurality of contact points 53 adapted to contact the plane 25 of the guide "G" of the cutting tool "OC". Preferably, the contact points 47 and 53 may be parallel ribs. Preferably, the ribs 47 and 53 have a relatively small thickness.

Advantageously, the first component 31 and the second component 33 each consist in a corresponding plate 31', 33' made out of a plastic material substantially resistant to deformations, each plate 31' and 33' having a common edge defining the abutment 55, and the plates 31' 33' together forming a throat 57 open towards the front and having a substantially V-shaped cross-sectional configuration. Preferably, the third component 35 consists in a plate 35' made out of a plastic material substantially resistant to deformations, the plate 35' having a common edge with the edge of plates 31 and 33 defining the abutment 55.

Preferably, the invention relates to a cutting guide "GC" as hereinabove defined wherein optional structural reinforcement means are provided between the first and third components 31, 35. Preferably, the reinforcement means comprises reinforcement components 58.

Preferably, the invention relates to a cutting guide "GC" as hereinabove defined wherein optional structural reinforcement means are provided between the first and second components 31, 33. Preferably, the reinforcement means includes reinforcement components 59.

Advantageously, the invention relates to a cutting guide as hereinabove defined, characterised in that the second component comprises a superior edge 61, and characterised in that the superior edge is provided with a set of marks or references 63 for determining the orientation of the blade and the positioning of the cutting guide GC and of the end of the crown moulding "MC" to be cut (left or right) and the type of assembly to be made (interior corner 65 or exterior corner 66 (see FIGS. 8 and 8*a*)).

Optionally, the invention relates to a cutting guide "GC" wherein the edge 61 may define a shoulder allowing for fixing in place the cutting guide "GC" on the cutting tool "OC" against the plane of the working table "T", notably by clamping means such as one or more vertical clamps 74 (see FIG. 13) when the cutting tool "OC" is provided with such means.

Advantageously, the invention relates to a cutting guide as hereinabove defined and characterised in that the angle determined by the planes 19 and 23 is of approximately 45 degrees.

Advantageously, the invention relates to a cutting guide as hereinabove defined and characterised in that it comprises an adapter 67 or 68 having substantially the shape of a corner and allowing for modification of the predetermined angles between the planes 19, 23. The adapter is provided with means for releasably fixing the latter to the first component 31 so that one of the faces of the corner defines a new inclined plane 23'. Preferably, the adapter 67 allows for modification of the predetermined initial angle of 45 degrees into a predetermined angle of 52 degrees, and the adapter 68 allows modification of the initial predetermined angle of 45 degrees into a predetermined angle of 38 degrees. Optionally, the adapters 67 and 68 may be combined into a single adapter, the orientation of the latter allowing for modification of the predetermined initial angle by ±7 degrees.

Preferably, the means for releasably fixing the adapter 67 or 68 to the first component 31 may be any suitable means depending on the material from which the guide and adapter 67 or 68 are made. For example, it may be one or more clips, reusable attachments, magnets, or the like. Preferably, the means for allowing the adapter 67 or 68 to be releasably attached to the first component 31 consists is a clip 69 or 70 engaging the superior edge of the first component 31 and being integral with the adapter 69 or 70.

Preferably, the adapters 67 and 68 and the clips 69 and 70 are made out of a material similar to that of the cutting guide "GC" and manufactured according to similar techniques. Preferably, they are made out of plastic such as PVC.

The cutting guide "GC" may have any suitable size for taking into consideration the format of the pieces to be cut and the needs.

Figure 1A:
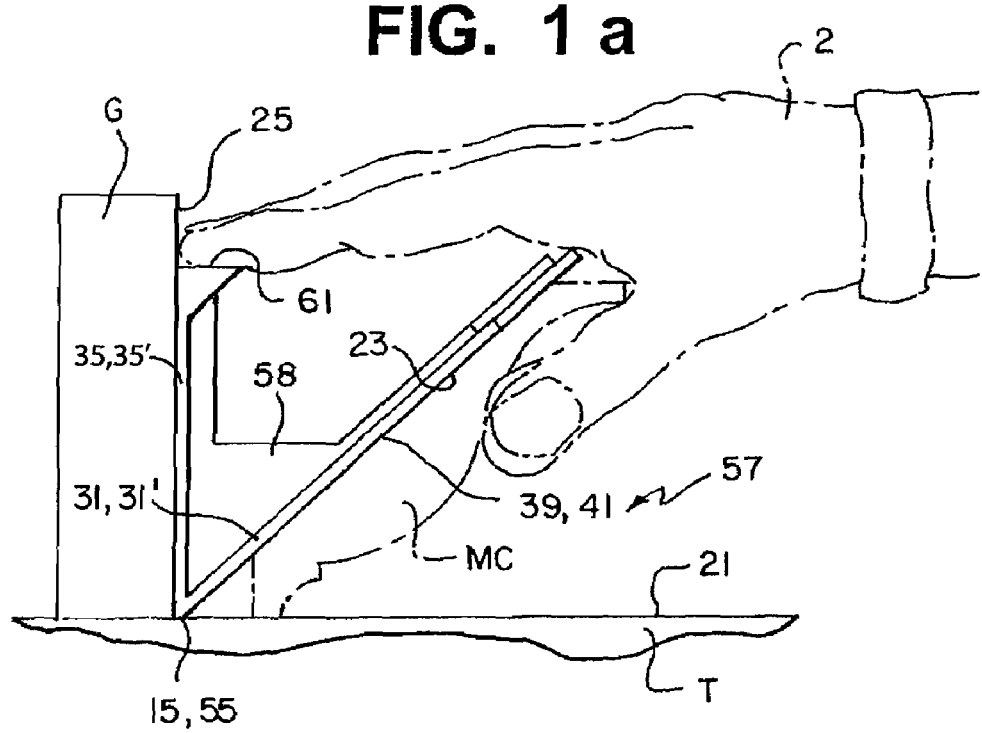
FIG. 1a, in a side view, illustrates a cutting guide in accordance with an alternative embodiment of the present invention wherein the second component of the guide shown in FIG. 1 has been removed.
Figure 1B:
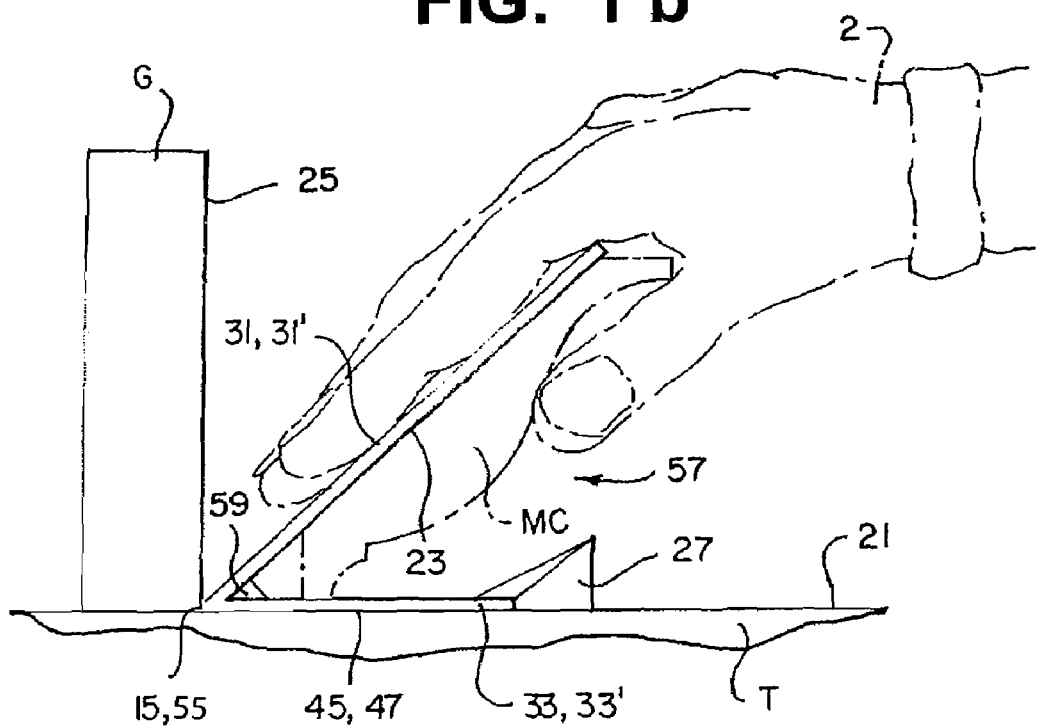
FIG. 1B, in a side view, illustrates an alternative embodiment of the cutting guide in accordance with an embodiment of the present invention wherein the third component of the guide shown in FIG. 1 has been removed.
Figure 2:
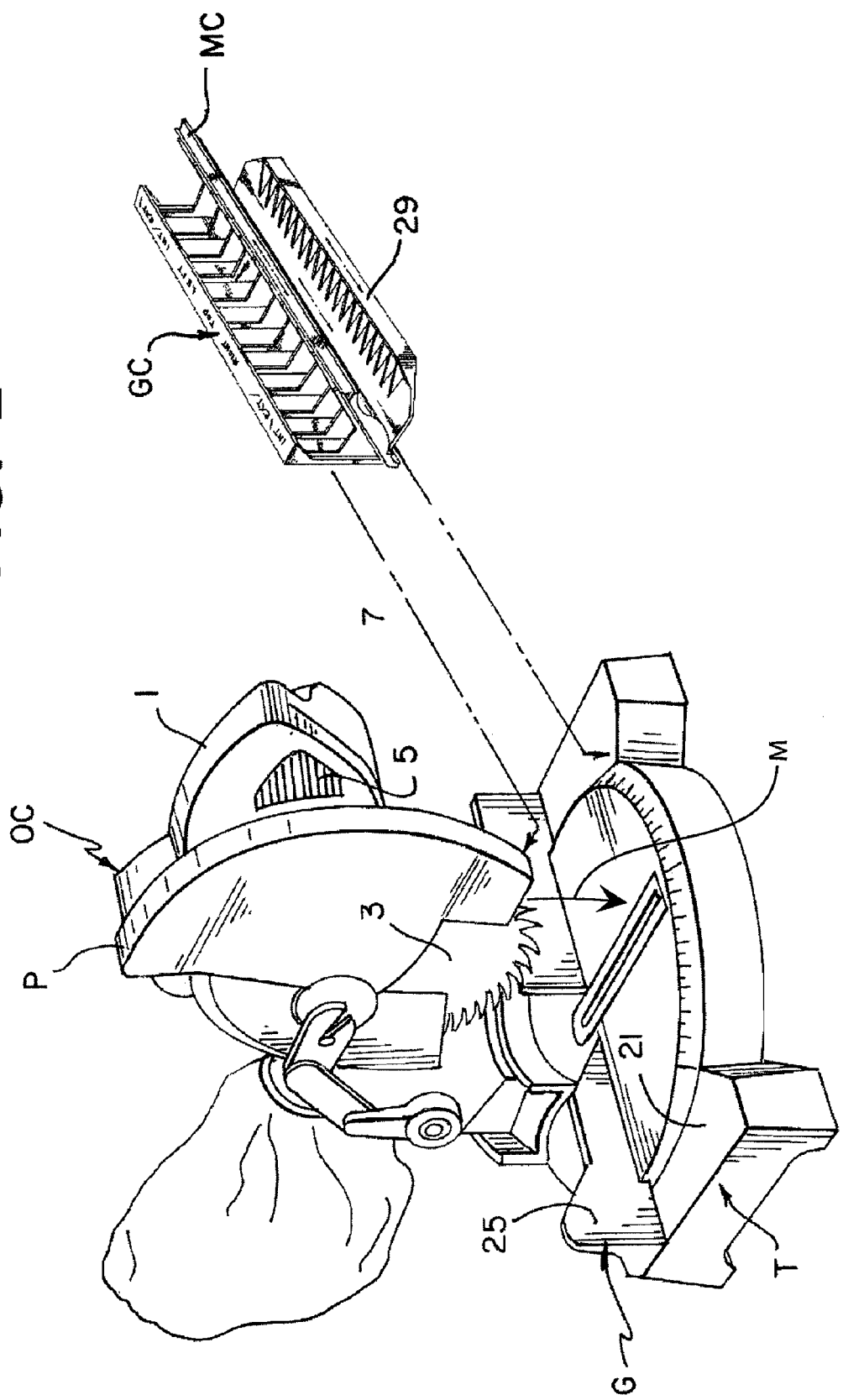
FIG. 2, in a perspective view, illustrates the cutting guide shown in FIG. 1 positioned adjacent a conventional motorized saw.
Figure 2A:
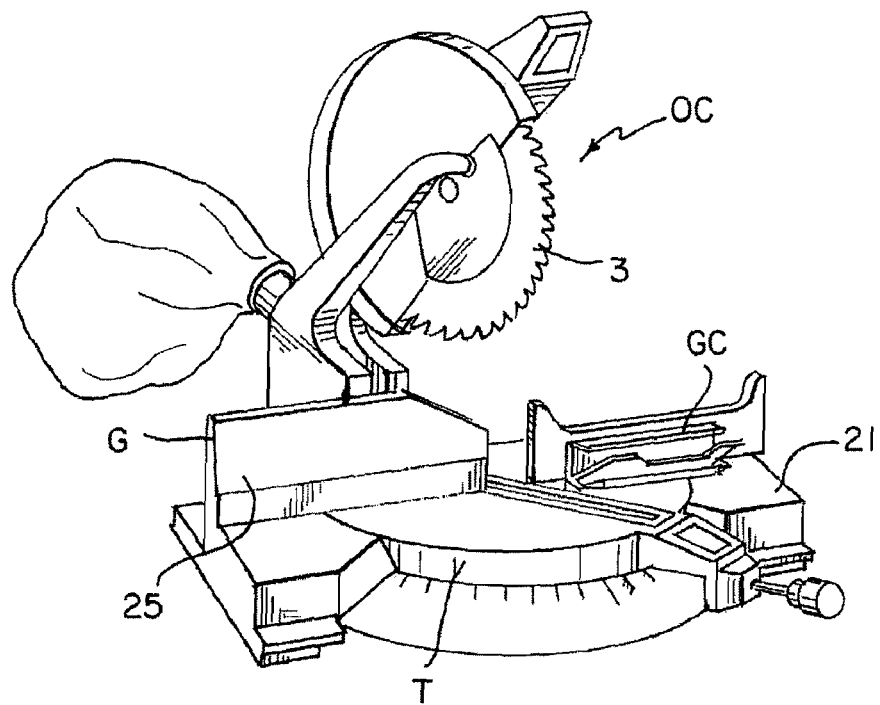
FIG. 2a, in a front view illustrates the cutting guide shown in FIG. 1 with a conventional motorised mitre saw.

Optionally, as illustrated in FIGS. 1*a* and 1*b*, the cutting guide may be provided without the third component 35 (see FIG. 1*a*) or without the second component 31 (see FIG. 1*b*). In the first case, only the abutment 55 contacts the plane of the guide whereas in the second case, the crown moulding contacts directly the plane of the working table "T". The other characteristics of the cutting guide are identical to those illustrated in FIG. 1.

Optionally, as illustrated in FIGS. 1*c* and 1*d*, the crown moulding "MC" (when the latter presents a front face substantially contained within a plane parallel to the rear portion), may be positioned on top of plate 31 or the cutting guide and according to the final installation orientation. More particularly, the front face of the crown moulding contacts the plane 23' which may preferably be a smooth surface 41'. Advantageously, each reinforcement component 59 may be replaced by a reinforcement component 60 identical to components 58. In both cases, the crown moulding directly contacts the plane of the guide of the cutting tool. The other characteristics of the cutting guide are identical to that illustrated in FIG. 1. Optionally, the cutting guide shown in FIG. 1*d* may be that of the figure with a third component oriented against the plane of the working table "T".

Advantageously, the invention also relates to a method for cutting a crown moulding "MC", characterised in that a cutting guide "GC" is positioned as hereinabove defined on a cutting tool "OC" including a working table "T" having a substantially horizontal plane, a guide "G" having a substantially vertical plane, a blade 3 and means "M" for angularly positioning the blade 3 relative to the guide "G", the plane of the working table "T" and the plane of the guide "G" being substantially orthogonal; the cutting guide "GC" having a first means 15 cooperating with the plane of the working table "T" and the plane of the guide "G" for maintaining its longitudinal axis 13 substantially parallel to the orthogonal planes; characterised in that depending on the type of cut to be made the crown moulding "MC is positioned so that a rear portion 9 thereof is against the inclined plane 23 and the inferior portion 11 of the drown moulding "MC" is against the plane 21 parallel and adjacent to the working table "T" or a plane coplanar with the working table "T"; and characterised in that the crown moulding "MC" is maintained manually (see hand 2) against respectively the inclined plane 23 and the plane 21 parallel and adjacent to the working "T" or coplanar to the plane of the table "T" and characterised in that the cutting guide "GC" is positioned relative to the trajectory of the blade 3 so that the crown moulding "MC" be cut at a desired angle and adjacent the ends of the cutting guide. Alternatively, when the cutting guide is such as that illustrated in FIGS. 1*c* and 1*d*, the front portion of the crown moulding "MC" is positioned on the inclined plane 23' and the inferior portion of the crown moulding "MC" is positioned against a plane parallel and adjacent to the plane of the guide "G" or coplanar with the plane of the guide "G".

Advantageously, with a cutting guide "GC" in accordance with the invention, the cut of a crown moulding "MC" may be made without having to tilt the blade of the saw. Hence, the blade 3 is lowered vertically (i.e. 90 degrees relative to the working table). Only the rotation of the saw as a function of the angle corresponding to the intersection of the walls has to be respected. Furthermore, with the cutting guide "GC", the crown moulding "MC" is cut according to a position which corresponds to that when installed.

When the crown moulding "MC" is placed within the cutting guide "GC", its inferior portion 11 is placed against the face 21 and the back 9 of the crown moulding "MC" is placed against the face 23. Indications shown on top of the cutting guide "GC" allow for determination of the positioning of the blade of the saw relative to the crown moulding "MC" to be cut.

More particularly, in order to use the references 63, the user must determine whether desired assembly is to be made on an exterior or interior corner on the piece to be cut. The references 63 appearing on the edge 61 of the cutting guide "GC" may then be used. Hence, this information allows for usage of the cutting guide "GC" either to the left or to the right of the blade 3.

It should be noted that the cutting angle of each crown moulding "MC" is always half the value of the desired angle. For example, for a 60 degrees junction, the cursor of the mitre blade will be at 30 degrees. Typically, the cursor is calibrated between 0 and 45 degrees. However, with a mitre saw having a cursor calibrated from 90 to 45 degrees, half of the junction angle between the walls must be subtracted from 90.

Figure 13:
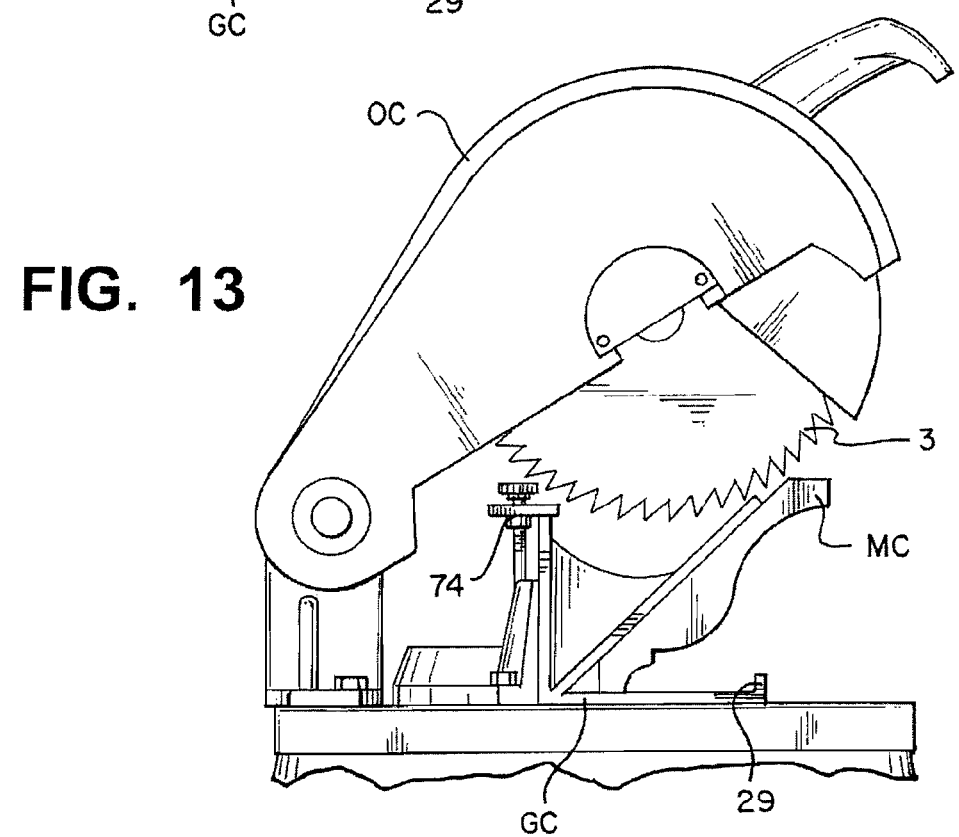
FIG. 13 represents a side view of an adapter in accordance with the present invention that may be attached to a motorised mitre saw using a substantially vertical clamp.

Preferably, after having adjusted the angle of the saw, depending on the junction angle of the walls, it is possible to secure the cutting guide to the cutting tool "OC" in order to obtain a further precision in the cut, preferably with the help of a clamp 73 such as shown in FIG. 12 or a clamp 74 such as shown in FIG. 13. Advantageously, the end 14 or 14" may be positioned at approximately one centimeter from the passage of the blade 3 of the saw.

In order to cut the crown moulding "MC", the latter is introduced in the cutting guide "GC" and maintained firmly with the hand 2 so that the back thereof abuts against the plane 23 and so that the back and underside of the cutting guide "GC" are abutted respectively against the plane of the guide "G" and the plane of the working table "T".

In certain types of mitre saw, some blade protectors "P" cannot be raised sufficiently in order to free the cutting guide "GC". In such instances, the protector may be manually raised in order to allow easy passage of the blade 3.

It should be understood that the hereinabove description of the invention is not limited and should encompass any variations susceptible of being perceived as obvious for a man skilled in the art.

The invention claimed is:

1. A cutting guide usable with a cutting tool, said cutting tool including a blade, said cutting guide allowing positioning of a piece according to an installation orientation relative to the blade, said tool being provided with a working table having a substantially horizontal plane, a guide having a substantially vertical plane and means for angularly positioning the blade relative to said guide, the plane of the working table and the plane of the guide forming orthogonal planes, said piece being of the type comprising a longitudinal axis, a rear portion substantially parallel to said axis and an inferior portion substantially parallel to said axis; said cutting guide comprising:

a longitudinal axis and opposed ends;

a first means cooperating with the plane of the working table and the plane of the guide for maintaining the longitudinal axis of the cutting guide substantially parallel to said orthogonal planes; and a second means comprising:

a first plane parallel and adjacent the plane of the working table or coplanar with that of the working table, and a second plane forming a predetermined angle inferior to 90 degrees relative to the first plane for receiving and orienting at least part of the rear portion of said piece according to a predetermined inclined plane, when said piece is maintained against said first and second planes for stably positioning said piece substantially according to the installation orientation relative to the blade, and for positioning the longitudinal axis of said piece substantially parallel to that of the cutting guide;

wherein said piece is adapted to be maintained manually against said first and second planes and said cutting guide is adapted to be positioned relative to the trajectory of the blade so that said piece is cut at a desired angle and a desired length adjacent one end of the cutting guide, wherein said piece to be cut is a crown moulding or an analogous moulding, wherein said first means comprises at least one rear abutment adapted to contact said orthogonal planes substantially at a point of merger of said orthogonal planes, wherein said second means comprises:

at least one component adapted to be abut against said orthogonal planes, a first component comprising a longitudinal axis and an anterior face presenting one or more contact points for the rear portion of the crown moulding, said contact points being substantially coplanar with said inclined plane, a second component comprising:

a longitudinal axis;

an inferior face provided with one or more contact points adapted to contact the plane of the working table; and a superior face comprising a plane substantially parallel to that of the working table, and a third component comprising a longitudinal axis and a face provided with one or more contact points adapted to contact the plane of guide of the cutting tool, wherein said cutting guide further comprises a substantially corner-shaped adapter allowing for modification of the predetermined angle, said adapter being provided with means for releasable mounting thereof to said first component so that one of the faces of said corner defines a new inclined plane.

2. A cutting guide as recited in claim 1, wherein the first component comprises a first plate of material substantially resistant to deformations and a first edge; and wherein the second component comprises a second plate of material substantially resistant to deformations and a second edge, wherein said cutting guide further comprises a throat formed from the abutment of the first edge and the second edge, opened towards a front and having a substantially V-shaped transversal cross-section configuration.

3. A cutting guide as recited in claim 2, wherein the third component comprises a third plate made of material substantially resistant to deformations, said plate having a third edge abutting the first edge and the second edge.

4. A cutting guide as recited in claim 3, further comprising reinforcement components provided between the first plate and the third plate.

5. A cutting guide as recited in claim 1, wherein the third component further comprises a superior edge, and wherein said superior edge includes a set of at least one of marks or references for determining an orientation of the blade relative to the end of the crown moulding, wherein the orientation is selected from the set consisting of left and right, and the type of assembly to be made, the type of assembly being selected from the set consisting of an interior corner and an exterior corner.

6. A cutting guide as recited in claim 1, wherein the ends of the first and second components are tapered.

7. A cutting guide as recited in claim 1, wherein the predetermined angle is 45 degrees.

8. A cutting guide as recited in claim 7, wherein the new inclined plane is 38 degrees or 52 degrees.

9. A cutting guide as recited in claim 6, wherein the cutting guide is made out of a single piece and made of a plastic material substantially resistant to deformations.

10. A cutting guide as recited in claim 1, wherein the third component is provided with a shoulder adapted to cooperate with a clamping device against the guide of the cutting tool.

11. A cutting guide as recited in claim 1, wherein the cutting tool is a miter saw.

\* \* \* \* \*